US007801556B2

(12) United States Patent
Tran

(10) Patent No.: US 7,801,556 B2
(45) Date of Patent: Sep. 21, 2010

(54) TUNABLE DUAL-ANTENNA SYSTEM FOR MULTIPLE FREQUENCY BAND OPERATION

(75) Inventor: Allen Minh-Triet Tran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 11/213,464

(22) Filed: Aug. 26, 2005

(65) Prior Publication Data

US 2007/0049213 A1 Mar. 1, 2007

(51) Int. Cl.
*H04B 1/44* (2006.01)
*H04B 1/04* (2006.01)
*H01Q 11/12* (2006.01)

(52) U.S. Cl. ...................... 455/552.1; 455/78; 455/121; 455/193.1; 455/275

(58) Field of Classification Search ............. 455/78–83, 455/101, 127.4, 129, 132, 121–123, 272–279.1, 455/552.1–553.1, 178.1, 193.1–193.2, 562.1, 455/575.7
See application file for complete search history.

(56) References Cited

U.S. PATENT DOCUMENTS 5,945,964 A 8/1999 DeGroot et al.
6,151,354 A * 11/2000 Abbey ........................ 375/211
6,339,399 B1 1/2002 Andersson et al.
6,476,769 B1 11/2002 Lehtola
7,202,790 B2 4/2007 Copeland et al.
2002/0183013 A1* 12/2002 Auckland et al. ............. 455/73
2003/0050032 A1 3/2003 Masaki
2004/0072542 A1* 4/2004 Sanford ....................... 455/73
2004/0130496 A1 7/2004 Iijima et al.
2004/0198473 A1 10/2004 Tran
2005/0085204 A1* 4/2005 Poilasne et al. .......... 455/193.1
2005/0164647 A1* 7/2005 Shamsaifar .................. 455/77
2006/0132360 A1* 6/2006 Caimi et al. .......... 343/700 MS
2006/0281423 A1* 12/2006 Caimi et al. ................ 455/129

FOREIGN PATENT DOCUMENTS

EP 1455459 A1 9/2004
JP 2004328285 11/2004
TW 419859 1/2001
WO 03/071713 A1 8/2003

OTHER PUBLICATIONS

International Search Report - PCT/US06/033772, International Search Authority - European Patent Office - Feb. 21, 2007.
Written Opinion - PCT/US06/033772, International Search Authority - European Patent Office - Feb. 21, 2007.

* cited by examiner

*Primary Examiner*—Simon D Nguyen
(74) *Attorney, Agent, or Firm*—Kenneth Vu

(57) ABSTRACT

A tunable dual-antenna system for multiple frequency band operation is disclosed, which allows a device to switch between multiple frequencies and/or multiple modes, such as CDMA and GSM. The system may comprise a tunable transmit antenna and a tunable receive antenna. One configuration may comprise multiple transmit antennas and multiple receive antennas.

23 Claims, 14 Drawing Sheets

TUNABLE DUAL-ANTENNA SYSTEM FOR MULTIPLE FREQUENCY BAND OPERATION

FIELD

The present application relates generally to communications, and more specifically, to a tunable dual-antenna system.

BACKGROUND

Wireless communication devices, such as mobile phones, may have a single antenna for transmitting and receiving signals. A desire to support multiple frequency bands and multiple wireless communication standards may require increasing the size of the existing antenna or installing additional antennas. These options create problems for newer wireless devices with small form factor.

DETAILED DESCRIPTION

Some wireless communication devices, such as "world phones," are intended to operate with multiple frequency bands ("multi-band") and multiple communication standards ("multi-mode"), which may need a multi-band antenna and/or multiple antennas to function properly. A law of physics dictates a multi-band antenna to be electrically bigger than a single-band antenna to function over the required frequency bands. A "multi-band" device can use one transmit/receive antenna for each frequency band and thus have multiple transmit/receive antennas (FIG. 1B). Alternatively, a "multi-band" device can use one multi-band antenna, but is required to add a multiplexer or a single-pole-multiple-throws switch to route the antenna signal for each frequency band to the appropriate transmitter and receiver of each band.

Similarly, a "multi-mode" device can use one transmit/receive antenna for each communication standard and thus have multiple transmit/receive antennas (FIG. 1B). Alternatively, a "multi-mode" device can use one multi-band antenna with additional multiplexers or single-pole-multiple-throws switches to operate. Some wireless standards, such as EV-DO (Evolution Data Optimized) and MIMO (Multiple Input Multiple Output), may use diversity schemes that need additional antennas to enhance data throughput performance and voice quality. The desire for more multi-band antennas on a wireless communication device has grown and has become an issue due to an increase in size and cost of wireless devices. Handset manufacturers are under pressure to reduce cost and size of their devices.

Figure 1A:
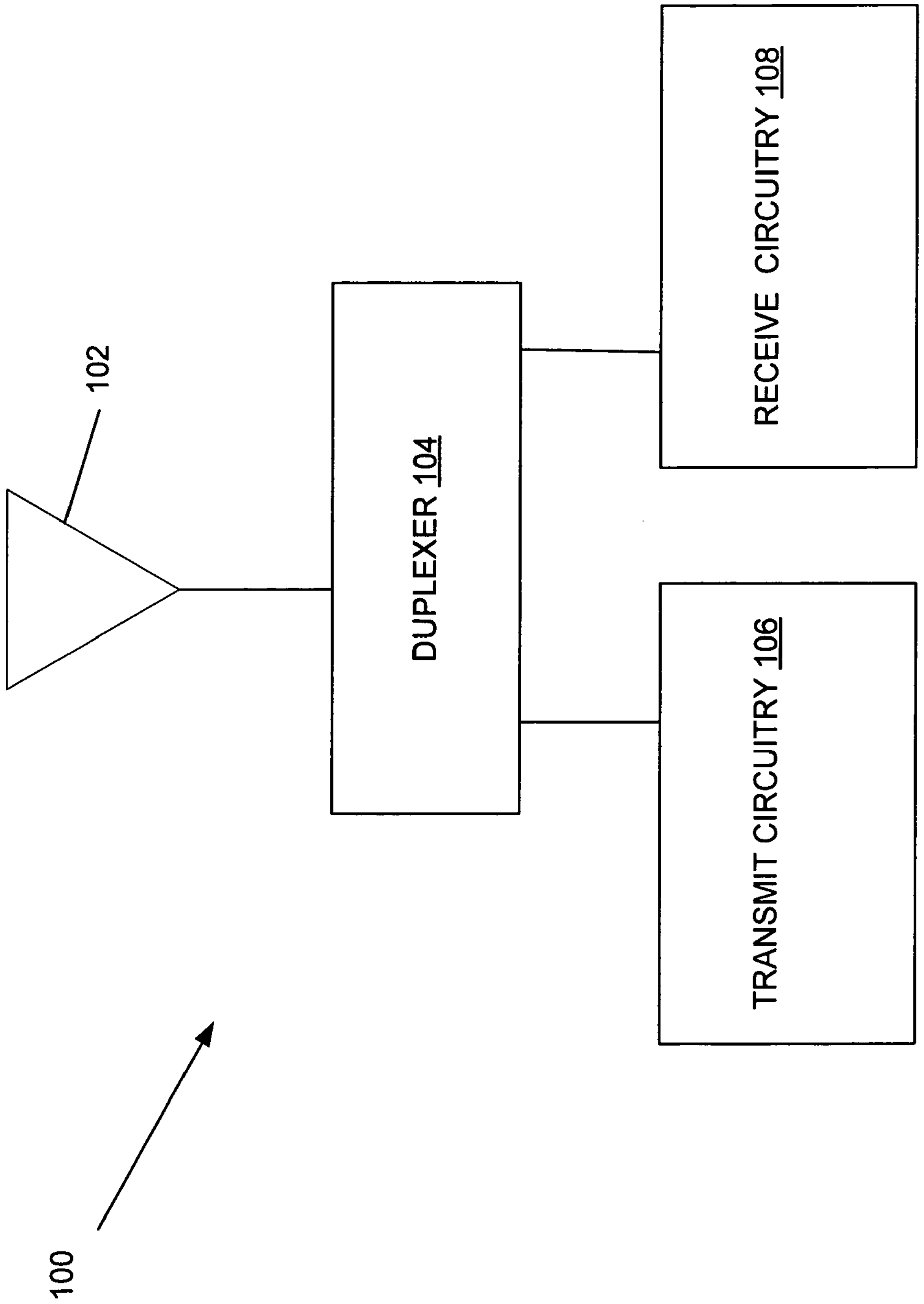
FIG. 1A illustrates a system with a single transmit/receive antenna.
Figure 1B:
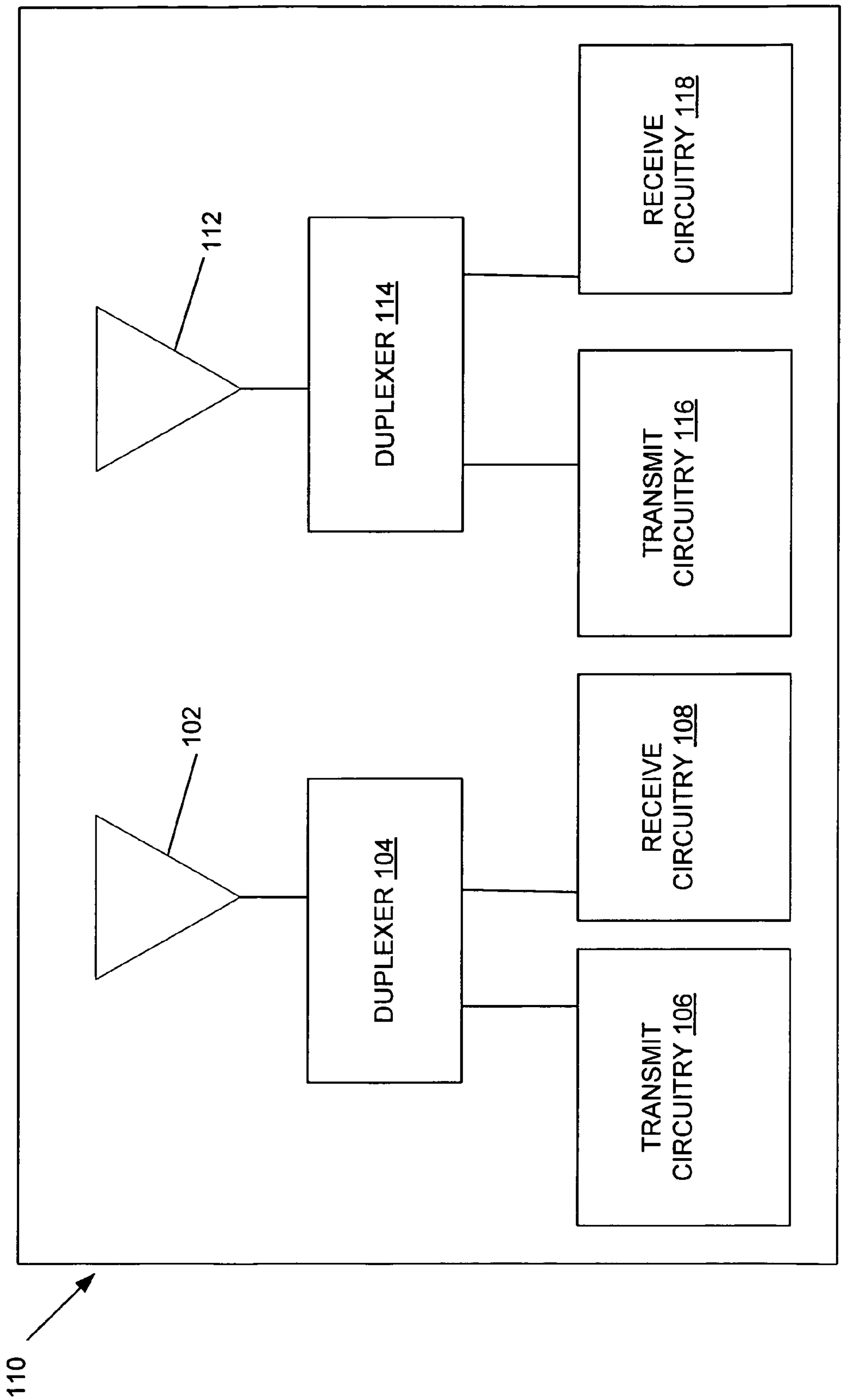
FIG. 1B illustrates a system with multiple transmit/receive antennas.

FIG. 1A illustrates a system 100 with a single transmit/receive antenna 102, a duplexer 104, transmit circuitry 106 and receive circuitry 108. The duplexer allows the transmit circuitry 106 and receive circuitry 108 to share the single antenna 102 for transmitting and receiving signals.

FIG. 1B illustrates a system 110 with multiple transmit/receive antennas 102, 112, duplexers 104, 114, transmit circuitries 106, 116 and receive circuitries 108, 118. As an example, antenna 102, duplexer 104, transmit circuitry 106 and receive circuitry 108 may be configured to transmit and receive CDMA signals, while antenna 112, duplexer 114, transmit circuitry 116 and receive circuitry 118 may be configured to transmit and receive GSM or WCDMA signals.

Figure 1C:
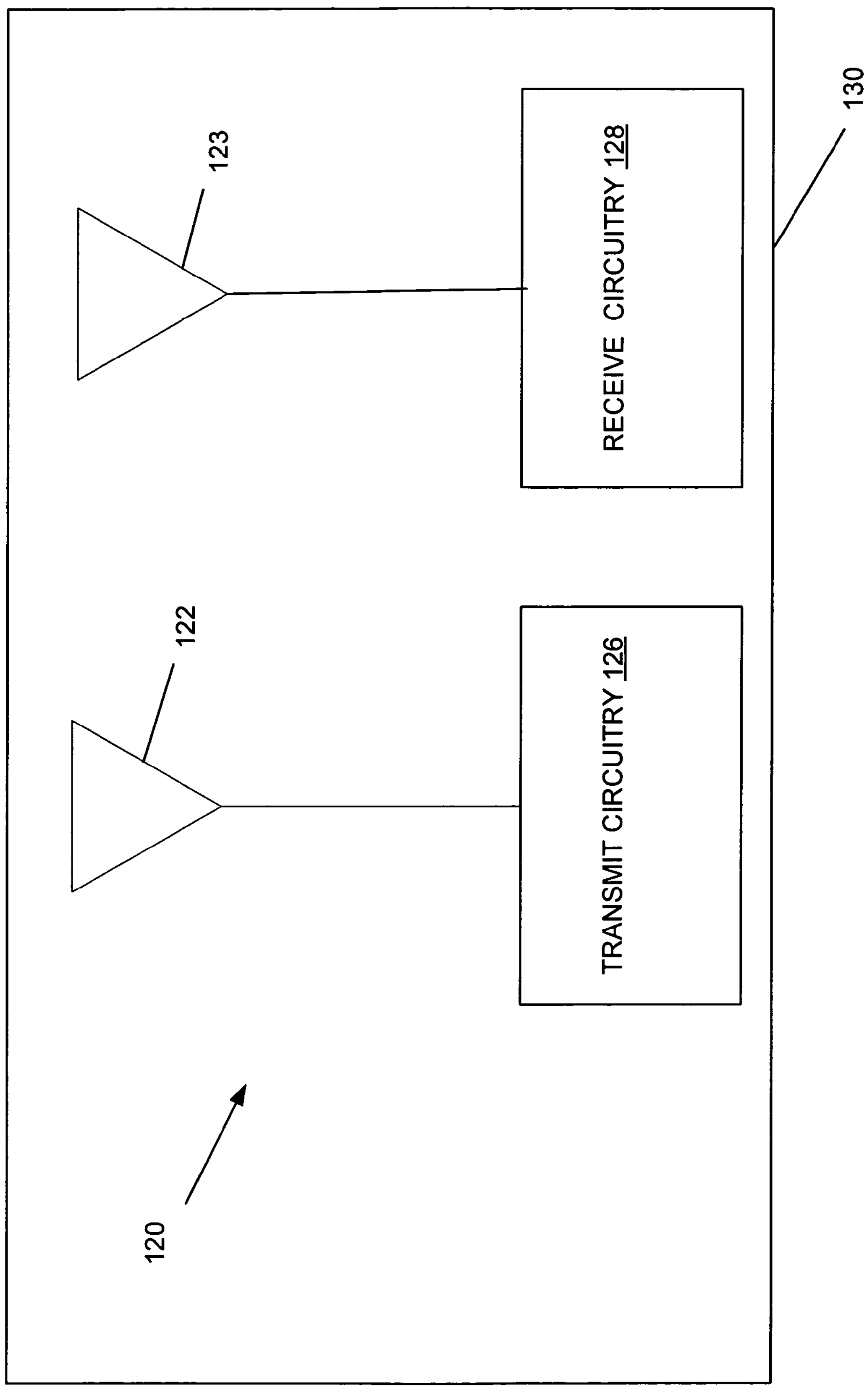
FIG. 1C illustrates a system with separate non-tunable transmit and receive antennas.

FIG. 1C illustrates a system 120 with separate non-tunable transmit and receive antennas 122, 123, transmit circuitry 126 and receive circuitry 128. A problem with this system 120 may be coupling, i.e., cross-talk, overlap or leakage, of energy or frequency between transmit and receive signals, as shown in FIG. 3C.

Figure 3A:
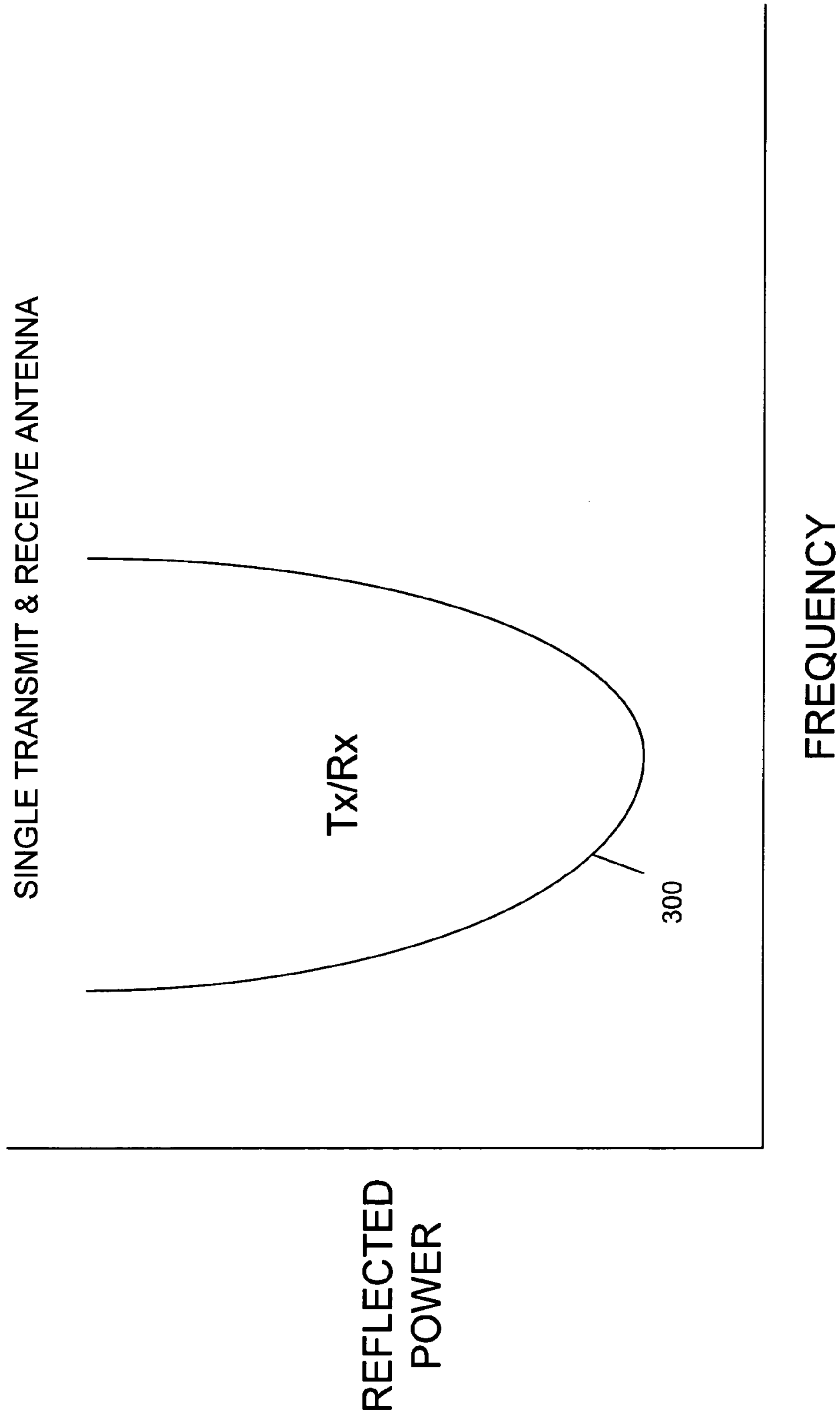
FIG. 3A illustrates antenna frequency response in terms of reflected power for a transmit and receive frequency band for the system of FIG. 1A.

FIG. 3A illustrates antenna frequency response in terms of reflected power for a transmit (Tx) and receive (Rx) frequency band 300 for the system 100 of FIG. 1A.

Figure 3B:
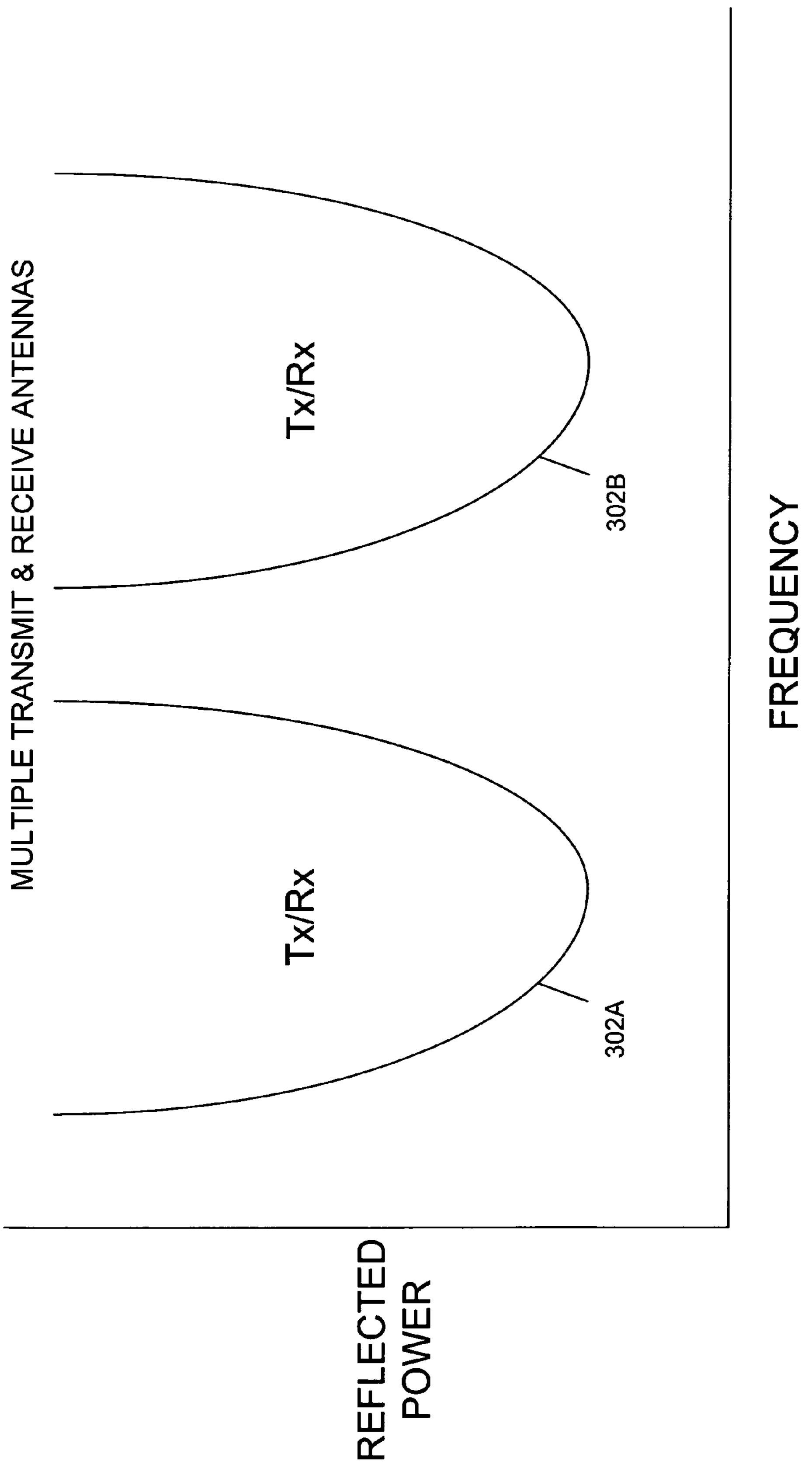
FIG. 3B illustrates antenna frequency response in terms of reflected power for transmit and receive frequency bands for the system of FIG. 1B.

FIG. 3B illustrates antenna frequency response in terms of reflected power for transmit and receive frequency bands 302A, 302B for the system 110 of FIG. 1B.

Figure 3C:
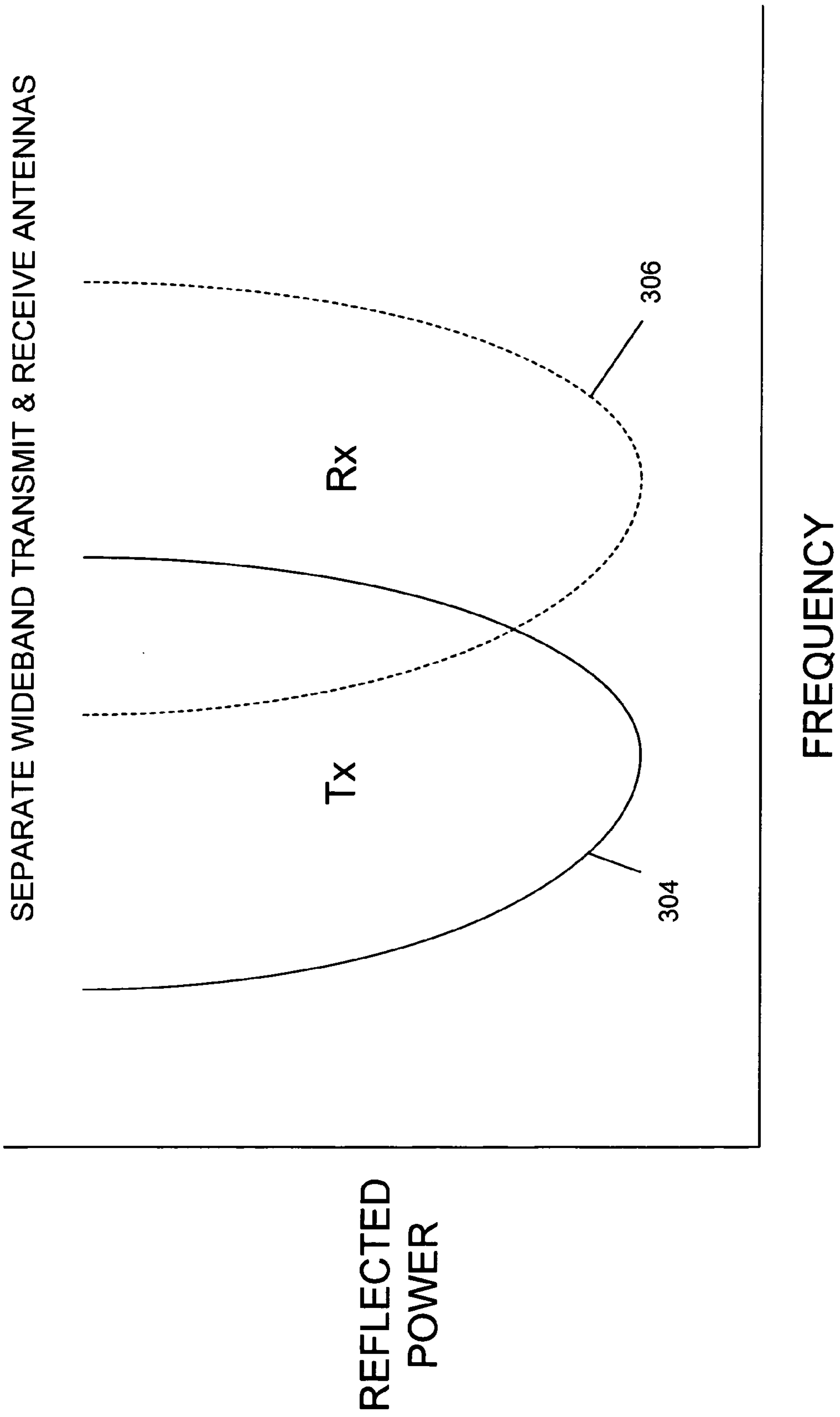
FIG. 3C illustrates antenna frequency response in terms of reflected power for transmit and receive frequency bands for the system of FIG. 1C.

FIG. 3C illustrates antenna frequency response in terms of reflected power for transmit and receive frequency bands 304, 306 for the system 120 of FIG. 1C.

As an example, an ideal transmit frequency band may be 824-849 Megahertz (MHz), and an ideal receive frequency band may be 869-894 MHz in one configuration. As shown in FIG. 3C, the transmit frequency band 304 overlaps with the receive frequency band 306, which may cause interference or noise in the transmit and receive circuitries 126, 128. Filters or isolators may have to be added to limit such interference or noise.

Figure 2A:
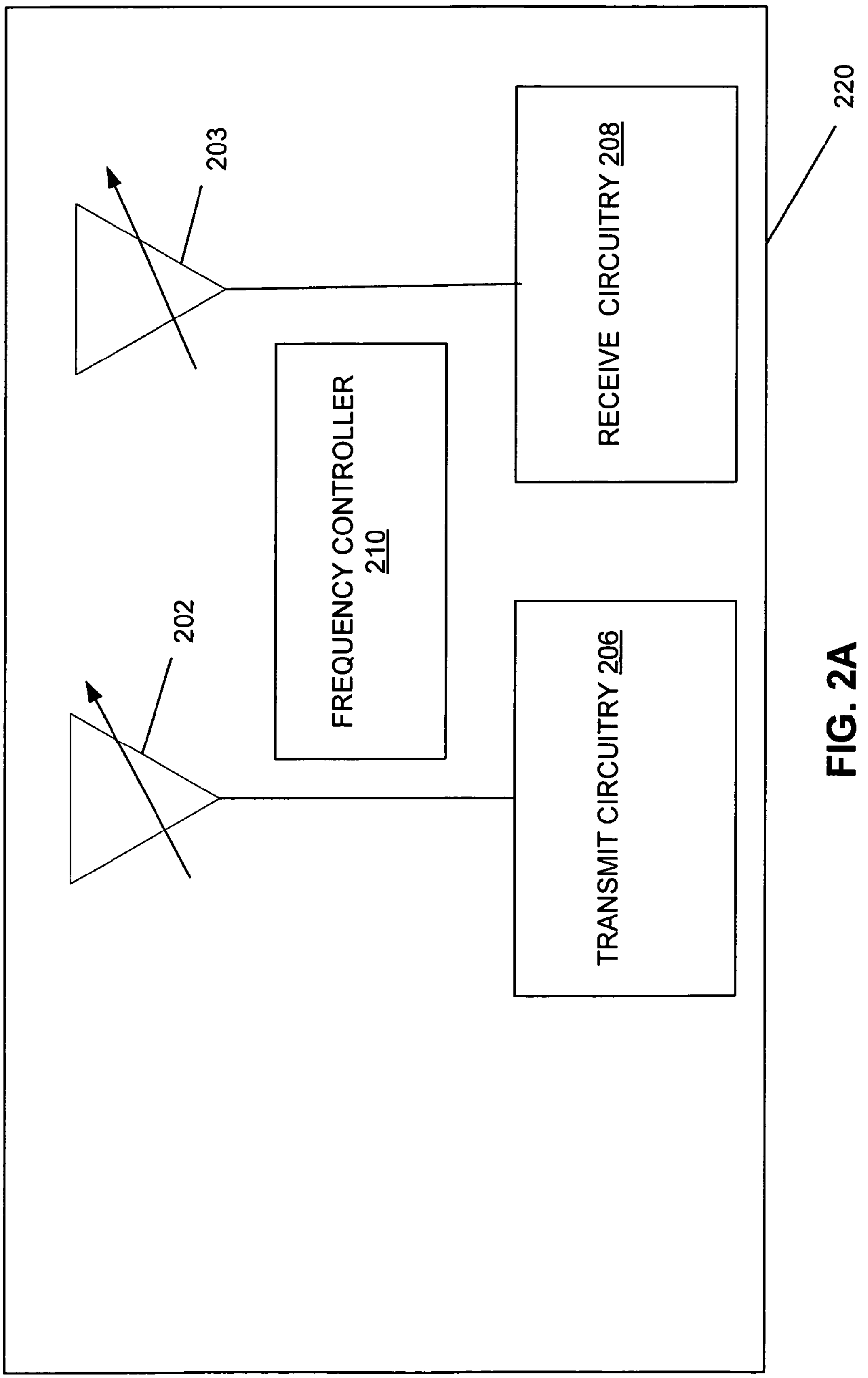
FIG. 2A illustrates a device with two tunable antennas in accordance with an embodiment of this application.

FIG. 2A illustrates a device 220 with two tunable antennas 202, 203, a frequency controller 210, transmit circuitry 206 and receive circuitry 208, in accordance with an embodiment of this application. The device 220 has one set of separate transmit and receive antennas 202, 203 that are tunable for multiple frequency bands and/or multiple wireless communication modes. The device 220 may be a wireless communication device, such as a mobile phone, a personal digital assistant (PDA), a pager, a stationary device, or a portable communication card (e.g., Personal Computer Memory Card International Association (PCMCIA)), which may be inserted, plugged in or attached to a computer, such as a laptop or notebook computer.

The antennas 202, 203 may be sufficiently small and sized to fit inside a particular communication device. The transmit and receive circuitries 206, 208 are shown as separate units, but may share one or more elements, such as a processor, memory, a pseudo-random noise (PN) sequence generators, etc. The device 220 may not require a duplexer 104 as in FIG. 1A, which may reduce the size and cost of the device 220.

The separate transmit and receive tunable antennas 202, 203 have frequency tuning/adapting elements, which may be controlled by frequency controller 210 to enable communication in multiple frequency bands (multi-band) (also called frequency ranges or set of channels) and/or according to multiple wireless standards (multiple modes). The antenna system 200 is configured to adaptively optimize its performance for a specific operating frequency. This may be useful for a user that wishes to use the device 200 in various countries or areas with different frequency bands and/or different wireless standards.

For example, the antennas 202, 203 may be tuned to operate in any frequency band of multi-band wireless applications, such as Code Division Multiple Access (CDMA) 450 MHz, CDMA 800 MHz, Extended Global System for Mobile communications (EGSM) 900 MHz, Global Positioning System (GPS) 1575 MHz, CDMA1800 MHz, CDMA1900 MHz, Digital Cellular System (DCS) 1700 MHz, Universal Mobile Telecommunications System (UMTS) 1900 MHz, etc. The antennas 202, 203 may be used for CDMA 1×EV-DO communication, which may use one or more 1.25-MHz carriers. The system 200 may use multiple wireless standards (multiple modes), such as CDMA, GSM, Wideband CDMA (WCDMA), Time-Division Synchronous CDMA (TD-SCDMA), Orthogonal Frequency Division Multiplexing (OFDM), WiMAX, etc.

The tuning elements of antennas 202, 203 may be separate elements or integrated as a single element. The tuning elements may be controlled by separate control units in the transmit and receive circuitries 206, 208 or be controlled by a single control unit, such as frequency controller 210.

Figure 4:
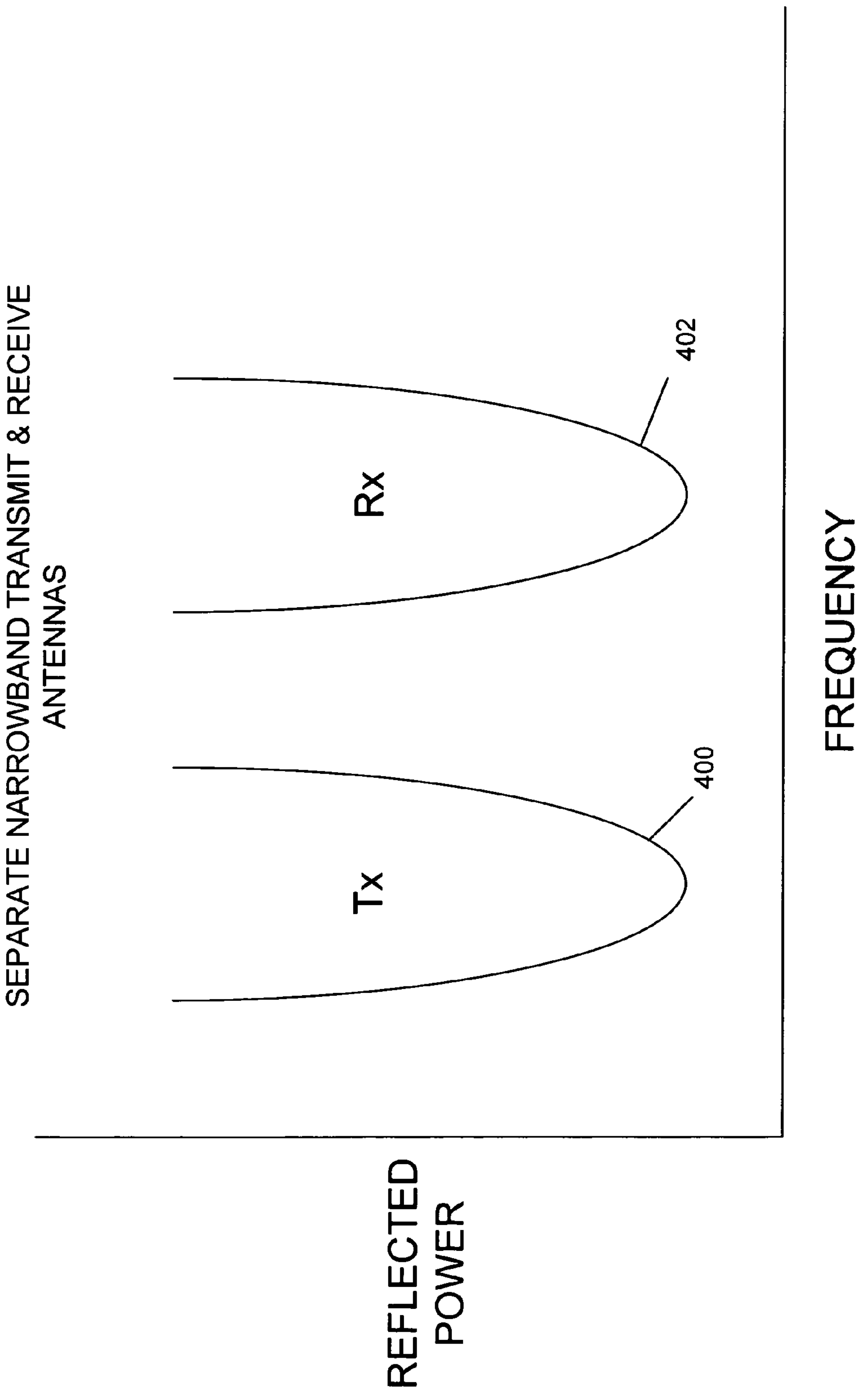
FIG. 4 illustrates antenna resonant frequency response in terms of reflected power for transmit and receive frequency bands for the system of FIG. 2.
Figure 8:
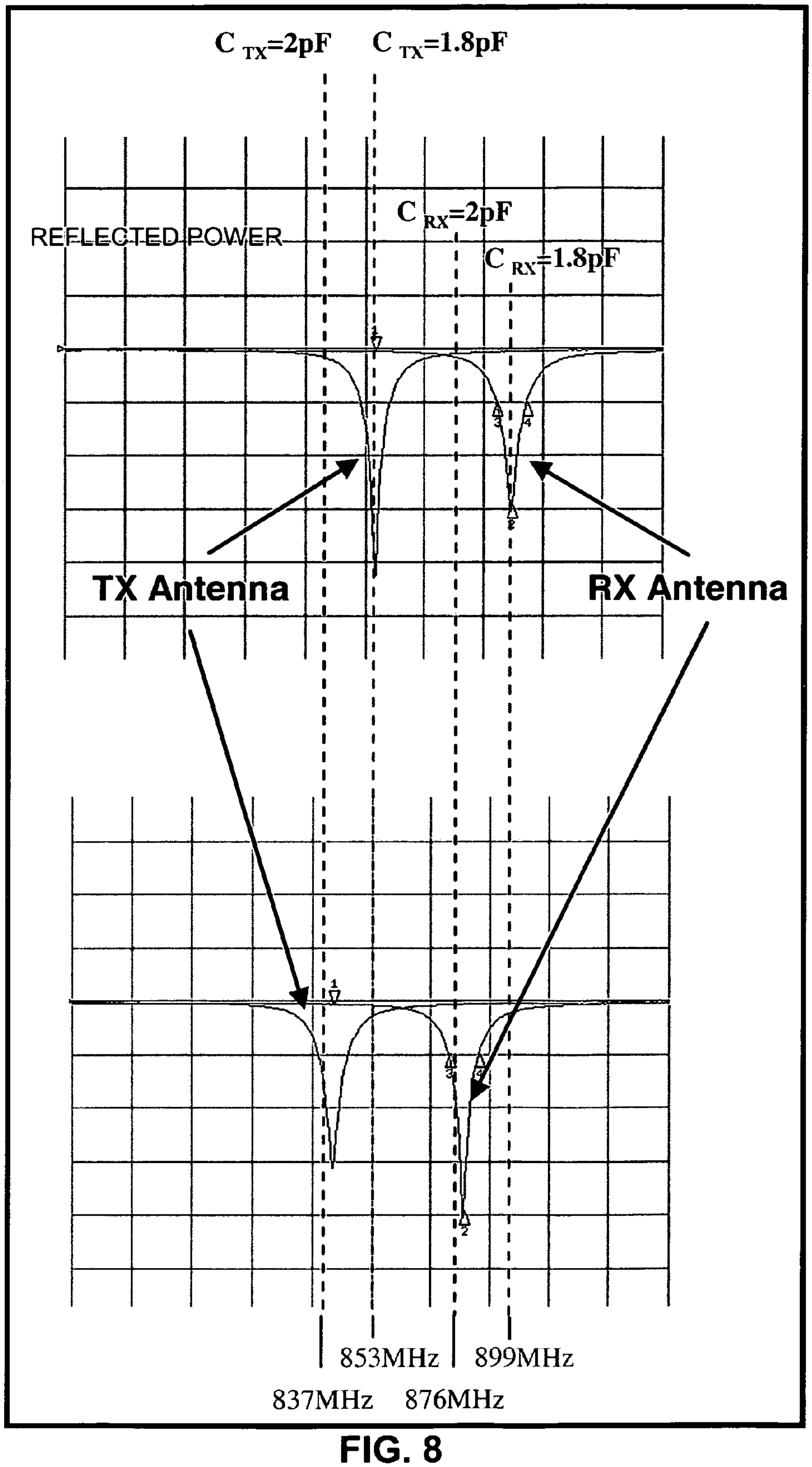
FIG. 8 illustrates an example of measured antenna frequency response in terms of reflected power to demonstrate frequency tunability of the TX/RX antenna pair of FIG. 2.

FIG. 4 illustrates a reflected power for transmit and receive frequency bands 400, 402 for the system 200 of FIG. 2. There is no overlap of the bands 400, 402 in FIG. 4 as there is in FIG. 3. There may be a fixed or adjustable gap between bands 400, 402. The bands 400, 402 may be narrower than bands 300, 302 in FIG. 3. The antennas 202, 203 may have narrower individual frequency responses to minimize coupling (or cross-talk) between the transmit and receive circuitries 206, 208. At any time slot, each antenna may cover only a small portion of a transmit or receive frequency sub-band around an operating channel, as shown in FIGS. 4 and 8.

The tuning elements may be used to change the operating frequency of the TX and RX antennas 202, 203. The tuning elements may be voltage-variable micro-electro mechanical systems (MEMS), voltage-variable Ferro-Electric capacitors, varactors, varactor diodes or other frequency adjusting elements. For example, a different voltage or current applied to a tuning element may change a capacitance of the tuning element, which changes a transmit or receive frequency of the antenna 202 or 203.

Figure 7:
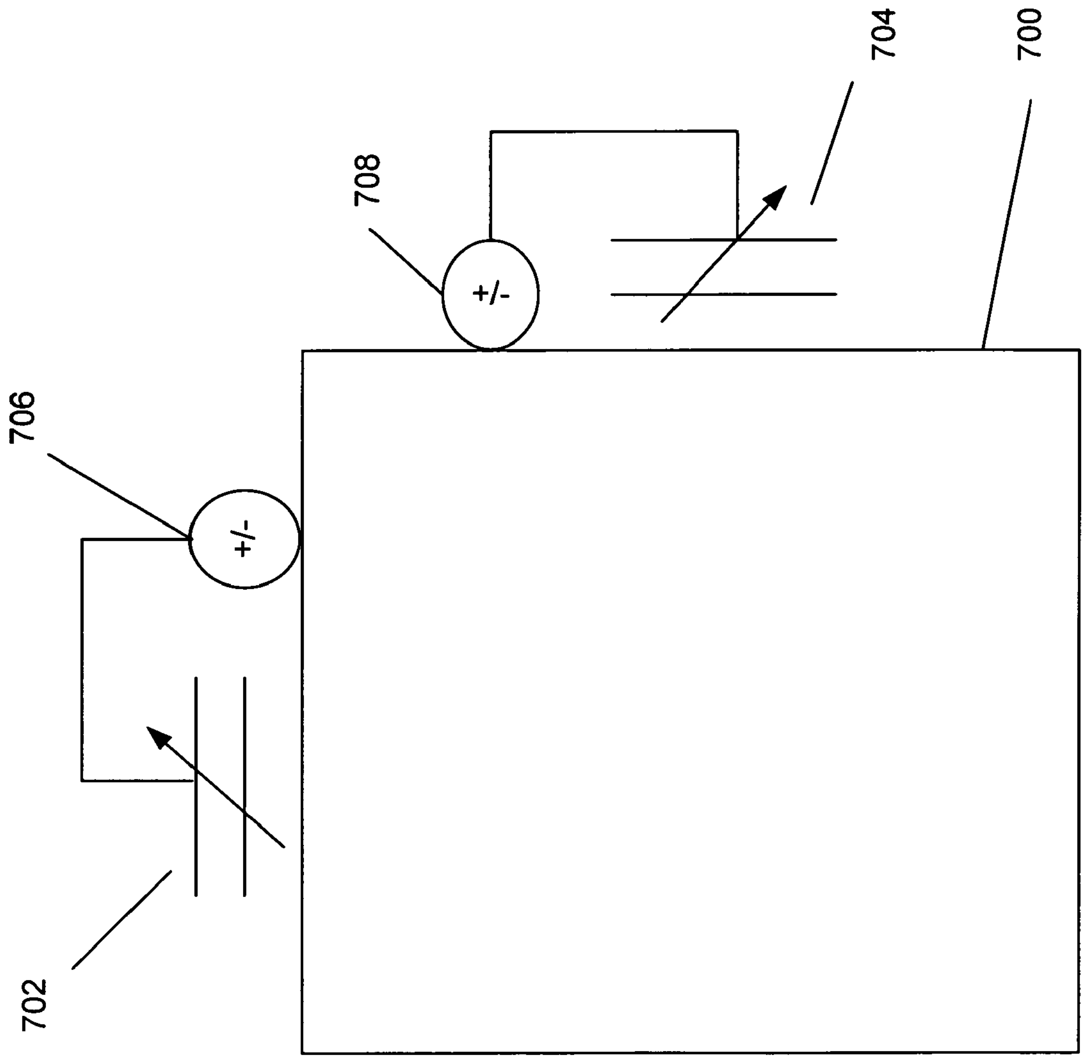
FIG. 7 illustrates a configuration where one antenna is positioned substantially orthogonal to a second antenna on or inside a device or a circuit board of the device.

The dual antenna system 200 may have one or more benefits. The dual antenna system 200 may be highly-isolated (low coupling, low leakage). A pair of orthogonal antennas as shown in FIG. 7 may provide even higher isolation (lower coupling). High-Q and narrow-band antennas may provide high isolation between TX and RX chains in a full-duplex system, such as a CDMA system.

By using separate and small TX and RX antennas 202, 203 with narrow instantaneous bandwidth to provide high isolation between the antennas 202, 203, the system 200 may allow certain duplexers, multiplexers, switches and isolators to be omitted from radio frequency (RF) circuits in multi-band and/or multi-mode devices, which saves costs and reduces circuit board area.

Smaller antennas provide more flexibility in selecting antenna mounting locations in the device 220.

The system 200 may enhance harmonic rejection to provide better signal quality, i.e., better voice quality or higher data rate.

The system 200 may enable integration of antennas with transmitter and/or receiver circuits to reduce wireless device size and cost. The frequency-tunable transmit and receive antennas 202, 203 of system 200 may enable size and cost reduction of host multi-mode and/or multi-band wireless devices by reducing the size and/or number of antennas.

Figure 2B:
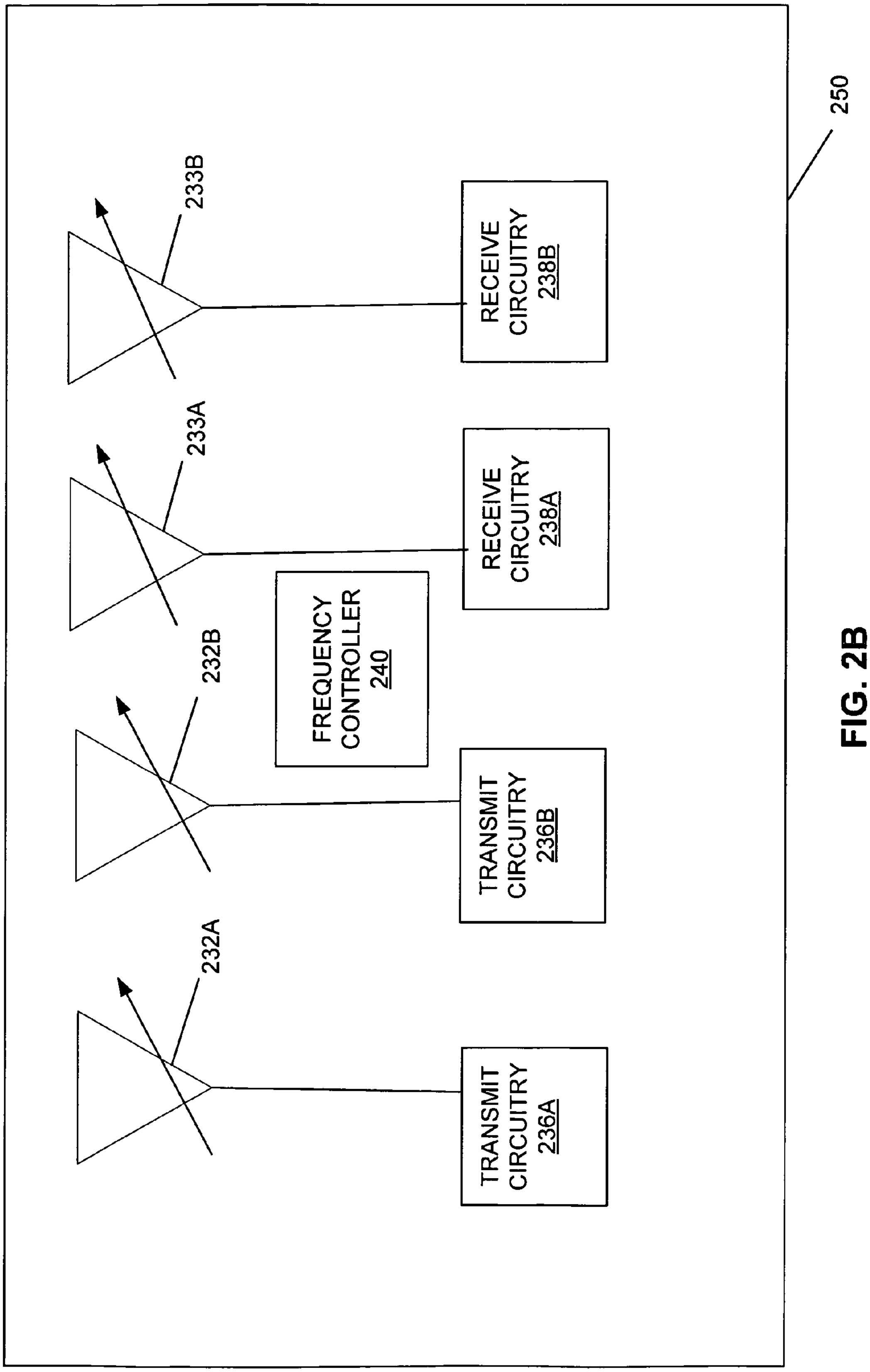
FIG. 2B illustrates a device with multiple tunable antennas, which may provide transmit and/or receive diversity.

The system 200 may be used to implement a diversity feature, e.g., polarization diversity (FIG. 7) or spatial diversity (FIG. 2B), for example, in EV-DO or MIMO systems. FIG. 2B illustrates a device with multiple tunable antennas 232A, 232B, 233A, 233B, which may provide transmit diversity and/or receive diversity. Any number of tunable transmit and/or receive antennas may be implemented.

Figure 5:
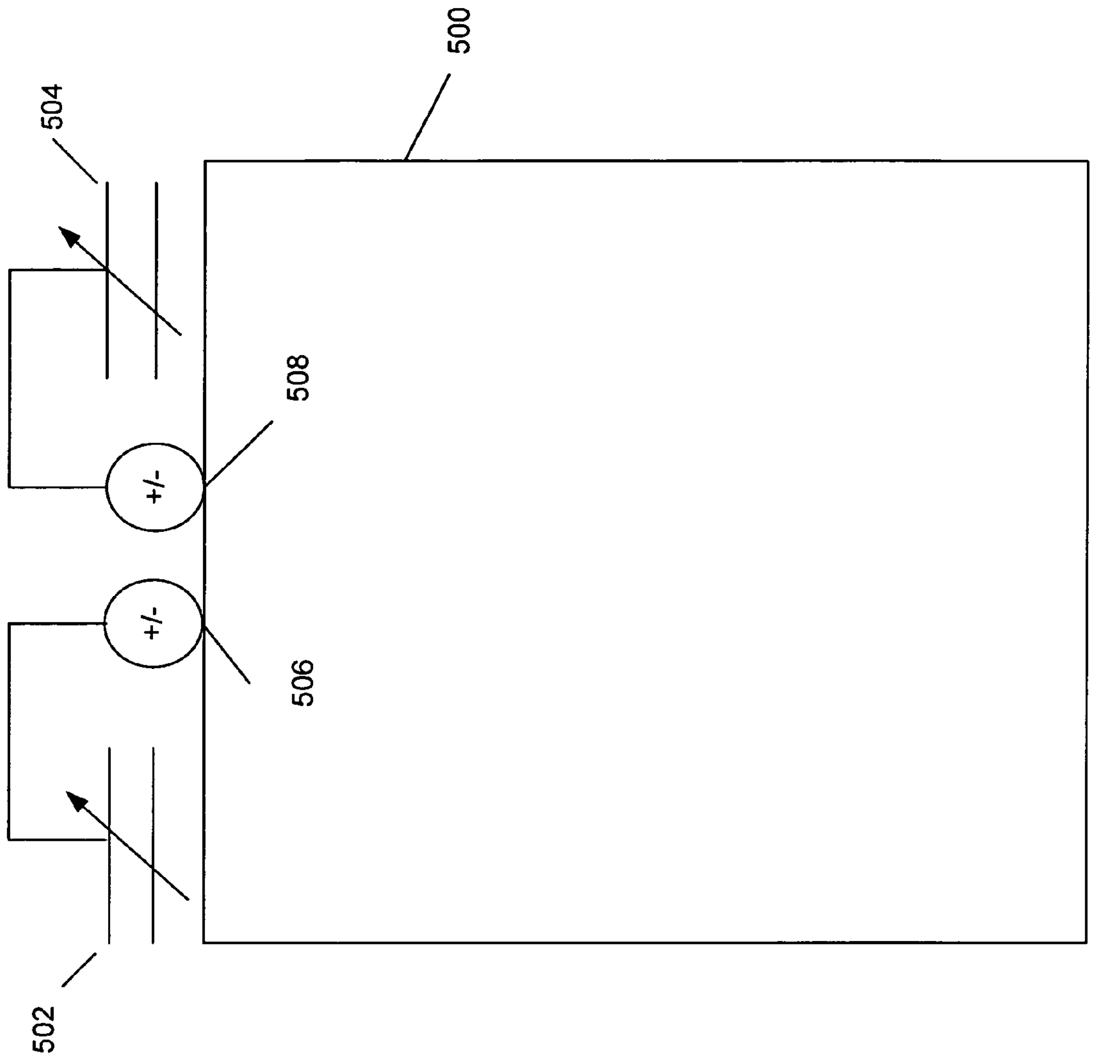
FIG. 5 illustrates a configuration where two antennas are positioned inside, near or on a top portion of a device or a circuit board of the device.
Figure 6:
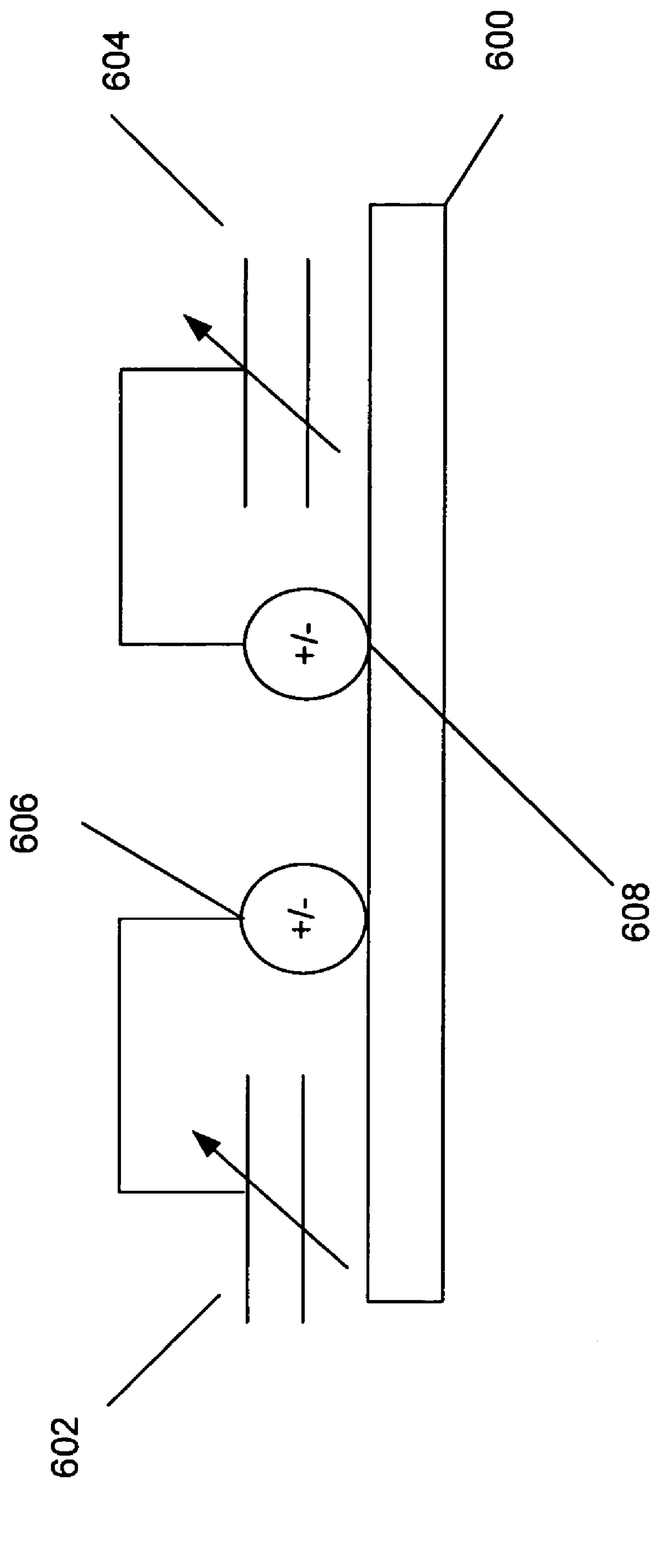
FIG. 6 illustrates a configuration where two antennas are positioned substantially orthogonal to a horizontal plane (cross-sectional view) of a device or a circuit board of the device.

The antennas 202, 203 of FIG. 2A may be configured in a variety of ways and locations inside a device 220. FIGS. 5-7 provide some examples.

FIG. 5 illustrates a configuration (front view) where two antennas (with tuning elements) 502, 504 are positioned inside, near or on a top portion of a device 500 or a plate or a circuit board of the device. FIG. 5 also shows transmit and receive circuitries or sources 506, 508.

FIG. 6 illustrates a configuration (cross-sectional end view) where two antennas 602, 604 are positioned substantially perpendicular to a horizontal plane of a device 600 or a circuit board of the device. This may be called a planar inverted "F" antenna (PIFA). FIG. 6 also shows transmit and receive circuitries 606, 608.

FIG. 7 illustrates a configuration (front view) where one antenna 702 is positioned substantially orthogonal to a second antenna 704 on or inside a device 700 or a circuit board of the device. FIG. 7 also shows transmit and receive circuitries 706, 708.

FIG. 8 illustrates an example of measured reflected power to demonstrate frequency tunability of the TX/RX antenna pair 202, 203 of FIG. 2. A top half of FIG. 8 shows a transmit antenna reflected power with a center frequency of 853 MHz and a capacitance of 1.8 picoFarads (pF). The top half also shows a receive antenna reflected power with a center frequency of 899 MHz and a capacitance of 1.8 pFs. A bottom half of FIG. 8 shows a transmit antenna reflected power with a center frequency of 837 MHz and a capacitance of 2 pFs. The bottom half also shows a receive antenna reflected power with a center frequency of 876 MHz and a capacitance of 2 pF. Other data may be measured using various configurations and parameters of the antenna system 200.

Figure 9:
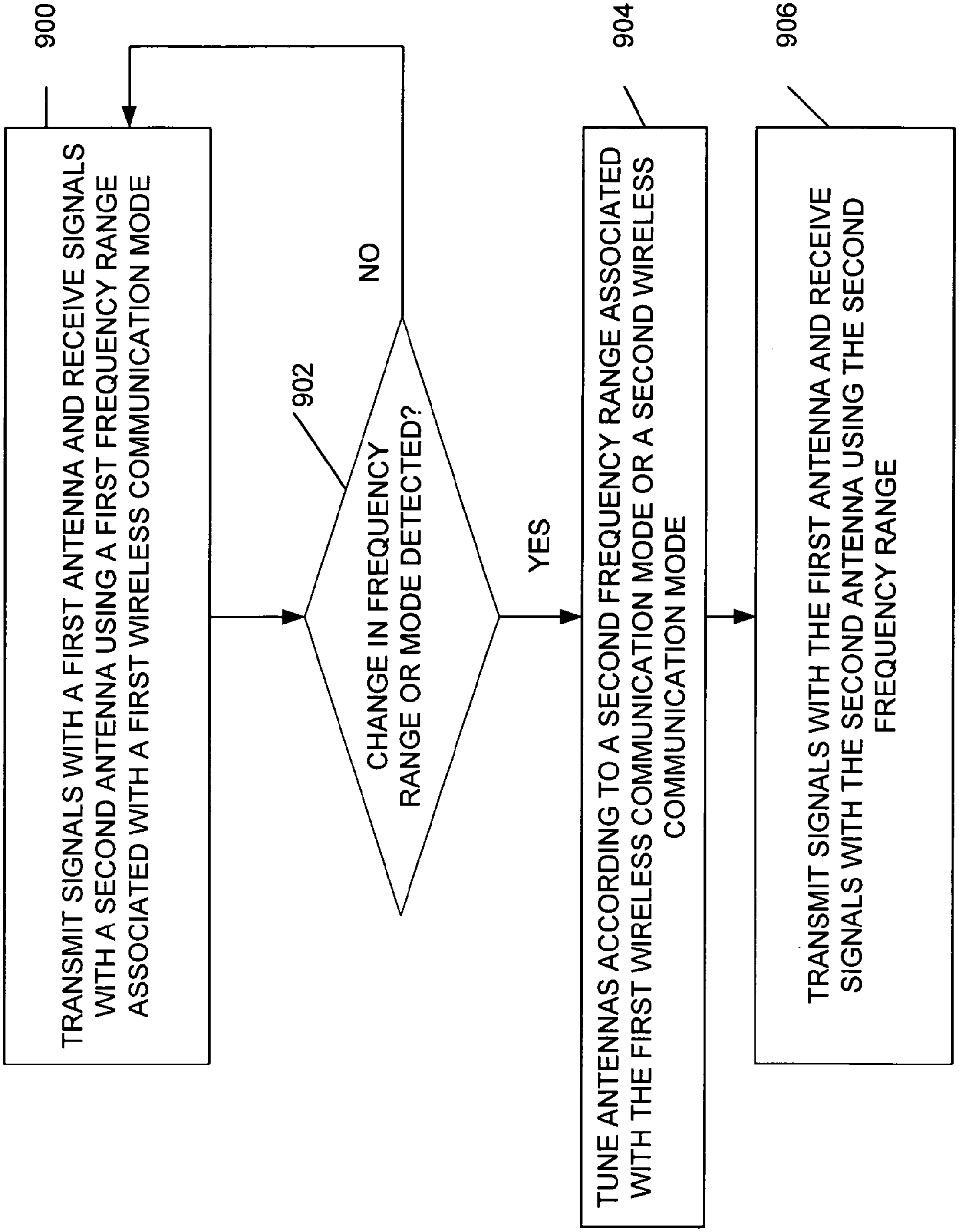
FIG. 9 illustrates a method of using the antenna system 200 of FIG. 2.

FIG. 9 illustrates a method of using the antenna system 200 of FIG. 2. In block 900, the system 200 transmits signals with a first antenna 202 and receives signals with a second antenna 203 using a first frequency range associated with a first wireless communication mode. The first frequency range may be a set of channels, e.g., channels defined by different codes and/or frequencies.

In block 902, the device 220 determines whether there has been a change in frequency range and/or mode. If not, the antenna system 200 may continue in block 900. If there was a change, then the system 200 transitions to block 904. The device 220 may determine whether a frequency range and/or second wireless communication mode provides better communication (pilot or data signal reception, signal-to-noise ratio (SNR), frame error rate (FER), bit error rate (BER), etc.) than the first frequency range and/or wireless communication mode.

In block 904, the system 200 tunes the antennas 202, 203 with elements 210, 212 according to a second frequency range associated with the first wireless communication mode or a second wireless communication mode. The second frequency range may be a set of channels, e.g., channels defined by different codes and/or frequencies.

In block 906, the system 200 transmits signals with the first antenna 202 and receives signals with the second antenna 203 using the second frequency range.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication device comprising:

a transmit antenna with a first tunable element to change a first transmit frequency band associated with a first communication mode to a second transmit frequency band associated with the first communication mode or a second communication mode, wherein the first tunable element is controlled by a first control unit for transmissions by the transmit antenna and not receptions by the transmit antenna, wherein the transmit antenna is tuned to the second transmit frequency band based on the device determining one or more of a signal-to-noise ratio (SNR), a frame error rate (FER), and a bit error rate (BER) associated with the second transmit frequency band; and a receive antenna with a second tunable element to change the first receive frequency band associated with the first communication mode to a second receive frequency band associated with the first communication mode or the second communication mode, wherein the second tunable element is controlled by a second control unit for receptions by the receive antenna and not transmissions by the receive antenna, wherein the receive antenna is tuned to the second receive frequency band based on the device determining one or more of a signal-to-noise ratio (SNR), a frame error rate (FER), and a bit error rate (BER) associated with the second receive frequency band.

2. The device of claim 1, wherein the frequency bands comprise at least two of Code Division Multiple Access (CDMA) 450 MHz, CDMA 800 MHz, Extended Global System for Mobile communications (EGSM) 900 MHz, Global Positioning System (GPS) 1575 MHz, CDMA 1800 MHz, CDMA 1900 MHz, Digital Cellular System (DCS) 1700 MHz, and Universal Mobile Telecommunications System (UMTS) 1900 MHz.

3. The device of claim 1, wherein the first transmit frequency band is at least 100 MHz higher than the second transmit frequency band.

4. The device of claim 1, wherein the first and second communication modes comprise at least two of CDMA, GSM, Wideband CDMA (WCDMA), Time-Division Synchronous CDMA (TD-SCDMA), Orthogonal Frequency Division Multiplexing (OFDM), and WiMAX.

5. The device of claim 1, wherein first and second tunable elements comprise voltage-variable micro-electro mechanical systems (MEMS).

6. The device of claim 1, wherein first and second tunable elements comprise voltage-variable Ferro-Electric capacitors.

7. The device of claim 1, wherein the first transmit frequency band and the first receive frequency band are substantially isolated from each other.

8. The device of claim 1, wherein the transmit antenna is orthogonally positioned to the receive antenna.

9. The device of claim 1, further comprising a second receive antenna with a third tunable element to provide receive diversity.

10. The device of claim 1, further comprising a second transmit antenna with a third tunable element to provide transmit diversity.

11. A wireless communication device comprising:

a transmitting means with a first tuning means to change a first transmit frequency band associated with a first communication mode to a second transmit frequency band associated with the first communication mode or a second communication mode, wherein the first tuning means is controlled by a first control unit for transmissions by the transmitting means and not receptions by the transmitting means, wherein the transmitting means is tuned to the second transmit frequency band based on the device determining one or more of a signal-to-noise ratio (SNR), a frame error rate (FER), and a bit error rate (BER) associated with the second transmit frequency band; and a receiving means with a second tuning means to change a first receive frequency band associated with the first communication mode to a second receive frequency band associated with the first communication mode or the second communication mode, wherein the second tuning means is controlled by a second control unit for receptions by the receiving means and not transmissions by the receiving means, wherein the receiving means is tuned to the second receive frequency band based on the device determining one or more of a signal-to-noise ratio (SNR), a frame error rate (FER), and a bit error rate (BER) associated with the second receive frequency band.

12. A wireless communication device comprising:

a transmit antenna with a first tunable element to change a first transmit frequency set of channels associated with a first communication mode to a second transmit frequency set of channels associated with the first communication mode or a second communication mode, wherein the first tunable element is controlled by a first control unit for transmissions by the transmit antenna and not receptions by the transmit antenna, wherein the transmit antenna is tuned to the second transmit frequency set of channels based on the device determining one or more of a signal-to-noise ratio (SNR), a frame error rate (FER), and a bit error rate (BER) associated with the second transmit frequency set of channels; and a receive antenna with a second tunable element to change a first receive frequency set of channels associated with the first communication mode to a second receive frequency set of channels associated with the first communication mode or the second communication mode, wherein the second tunable element is controlled by a second control unit for receptions by the receive antenna and not transmissions by the receive antenna, wherein the receive antenna is tuned to the second receive frequency set of channels based on the device determining one or more of a signal-to-noise ratio (SNR), a frame error rate (FER), and a bit error rate (BER) associated with the second receive frequency set of channels.

13. A method for wireless communications, the method comprising: transmitting signals with a first antenna and receiving signals with a second antenna using a first frequency range associated with a first wireless communication mode;

tuning the first and second antennas to a second frequency range associated with the first communication mode or a second wireless communication mode, wherein the tuning of the first antenna is controlled by a first control unit for transmissions by the first antenna and not receptions by the first antenna and the tuning of the second antenna is controlled by a second control unit for receptions by the second antenna and not transmissions by the second antenna, wherein the first and second antennas are tuned to the second frequency range based on a wireless device determining one or more of a signal-to-noise ratio (SNR), a frame error rate (FER), and a bit error rate (BER) associated with the second frequency range; and transmitting signals with the first antenna and receiving signals with the second antenna using the second frequency range.

14. The method of claim 13, further comprising determining whether the second wireless communication mode provides better communication than the first wireless communication mode.

15. The method of claim 13, wherein the frequency ranges comprise at least two of Code Division Multiple Access (CDMA) 450 MHz, CDMA 800 MHz, Extended Global System for Mobile communications (EGSM) 900 MHz, Global Positioning System (GPS) 1575 MHz, CDMA 1800 MHz, CDMA 1900 MHz, Digital Cellular System (DCS) 1700 MHz, and Universal Mobile Telecommunications System (UMTS) 1900 MHz.

16. The method of claim 13, wherein the first frequency range is at least 100 MHz higher than the second frequency range.

17. The method of claim 13, wherein the first and second communication modes comprise at least two of CDMA, GSM, Wideband CDMA (WCDMA), Time-Division Synchronous CDMA (TD-SCDMA), Orthogonal Frequency Division Multiplexing (OFDM), and WiMAX.

18. The method of claim 13, wherein the first antenna and second antenna use frequency bands that are substantially isolated from each other.

19. The method of claim 13, further comprising receiving signals with a third antenna to provide receive diversity.

20. The method of claim 13, further comprising transmitting signals with a third antenna to provide transmit diversity.

21. A method for wireless communications, the method comprising:

transmitting signals with a first antenna and receiving signals with a second antenna using a first frequency set of channels associated with a first wireless communication mode;

tuning the first and second antennas to a second frequency set of channels associated with the first communication mode or a second wireless communication mode, wherein the tuning of the first antenna is controlled by a first control unit for transmissions by the first antenna and not receptions by the first antenna and the tuning of the second antenna is controlled by a second control unit for receptions by the second antenna and not transmissions by the second antenna, wherein the first and second antennas are tuned to the second frequency set of channels based on a wireless device determining one or more of a signal-to-noise ratio (SNR), a frame error rate (FER), and a bit error rate (BER) associated with the second frequency set of channels; and transmitting signals with the first antenna and receiving signals with the second antenna using the second frequency set of channels.

22. An apparatus for wireless communications, the apparatus comprising:

means for transmitting signals with a first antenna and receiving signals with a second antenna using a first frequency range associated with a first wireless communication mode;

means for tuning the first and second antennas to a second frequency range associated with the first communication mode or a second wireless communication mode, wherein the tuning of the first antenna is controlled by a first control unit for transmissions by the means for transmitting and not receptions by the means for transmifting and the tuning of the second antenna is controlled by a second control unit for receptions by the means for receiving and not transmissions by the means for receiving, wherein the first and second antennas are tuned to the second frequency range based on the apparatus determining one or more of a signal-to-noise ratio (SNR), a frame error rate (FER), and a bit error rate (BER) associated with the second frequency range; and means for transmitting signals with the first antenna and receiving signals with the second antenna using the second frequency range.

23. A processor readable storage medium having instructions for:

transmitting signals with a first antenna and receiving signals with a second antenna using a first frequency range associated with a first wireless communication mode;

tuning the first and second antennas to a second frequency range associated with the first communication mode or a second wireless communication mode, wherein the tuning of the first antenna is controlled by a first control unit for transmissions by the first antenna and not receptions by the first antenna and the tuning of the second antenna is controlled by a second control unit for receptions by the second antenna and not transmissions by the second antenna, wherein the first and second antennas are tuned to the second frequency range based on a wireless device determining one or more of a signal-to-noise ratio (SNR), a frame error rate (FER), and a bit error rate (BER) associated with the second frequency range; and transmitting signals with the first antenna and receiving signals with the second antenna using the second frequency range.

* * * * *